United States Patent [19]

Lacher et al.

[11] Patent Number: 5,251,535
[45] Date of Patent: Oct. 12, 1993

[54] PROCESS FOR CONTROLLING AN ACTUATOR WHICH CAN BE ADJUSTED BY MEANS OF A PROPORTIONAL VALVE

[75] Inventors: Franz X. Lacher, Barbing; Erwin Grauvogl, Sinzing; Hans Rauner, Nittenau; Reinhard Auffhammer, Dachau; Harald Hahn; Helmut Patze, both of Frammersbach, all of Fed. Rep. of Germany

[73] Assignees: Siemens AG, Munich; Mannesmann Rexrogh GmbH, Lohr; Bayerische Motoren Werke AG, Munich, all of Fed. Rep. of Germany

[21] Appl. No.: 907,835

[22] Filed: Jul. 2, 1992

[30] Foreign Application Priority Data

Jan. 5, 1990 [DE] Fed. Rep. of Germany ....... 4000221

[51] Int. Cl.[5] ............................................. F15B 13/043
[52] U.S. Cl. ......................................... 91/471; 91/459; 91/461; 137/625.64; 251/129.05
[58] Field of Search .................. 91/459, 461, 471; 137/625.64; 251/129.05

[56] References Cited

FOREIGN PATENT DOCUMENTS 3205860 8/1983 Fed. Rep. of Germany .
1042882 9/1966 United Kingdom .

Primary Examiner—Gerald A. Michalsky
Attorney, Agent, or Firm—Herbert L. Lerner; Laurence A. Greenberg

[57] ABSTRACT

In a process for controlling an actuator which can be adjusted by means of a proportional valve, the proportional valve is controllable by means of two control magnets with control pulses acting in opposite directions. A phase angle between the control pulses is varied as a function of at least one control variable (command variable, correction variable or difference between the amplitudes or pulse durations of the control pulses), i.e. it is reduced as the control variable increases. This measure prevents undesired vibrations of the actuator and resulting noises.

9 Claims, 1 Drawing Sheet

PROCESS FOR CONTROLLING AN ACTUATOR WHICH CAN BE ADJUSTED BY MEANS OF A PROPORTIONAL VALVE

CROSS-REFERENCE TO RELATED APPLICATION

This application is a Continuation of International Application Ser. No. PCT/DE90/00981, filed Dec. 20, 1990.

The invention relates to a process for controlling an actuator which can be adjusted by means of a proportional valve, wherein the proportional valve is controllable by means of two control magnets with control pulses acting in opposite directions, having variable amplitude or pulse duration and having a specific frequency and specific mutual phase angle.

The structure and mode of operation of such a control device are described in German Published, Non-Prosecuted Application DE 32 05 860 A1. In that publication, two control magnets of a proportional valve are indeed actuated with analog control signals but an actuation process with control pulses that act in opposite directions with variable amplitude or duration and a specific frequency and specific mutual phase angle is what is generally known.

It is especially in small-scale hydraulics where the intrinsic frequency of the actuator is substantially larger than that of the proportional valve due to the structure of such control devices, that the actuator reacts to every change in position of the control piston of the proportional valve virtually without delay.

In order to keep the static friction of such a control valve as small as possible, the proportional valve is actuated with control pulses acting in opposite directions in such a way that the two control magnets, as already described above, are acted upon with two control pulse trains which have a constant phase angle that is usually 180° with respect to one another. The deflection of the control piston out of its central position occurs by varying amplitude or duration of the control pulses in opposite directions.

Such an alternating actuation often manifests itself as undesired vibration of the actuator, which leads to considerable noise problems in many applications.

It is accordingly an object of the invention to provide a process for controlling an actuator which can be adjusted by means of a proportional valve, that overcomes the hereinafore-mentioned disadvantages of the heretofore-known methods of this general type and in which no noise problems of that kind occur.

With the foregoing and other objects in view there is provided, in accordance with the invention, a process for controlling an actuator which can be adjusted by means of a proportional valve, which comprises controlling the proportional valve by means of two control magnets with control pulses acting in opposite directions and having variable amplitude or pulse duration and a specific frequency and specific mutual phase angle, and varying the phase angle as a function of at least one control variable or of a variable associated with a control variable.

Tests have shown that a vibration of the actuator and associated undesired noises only become perceptible from a specific minimum value of the adjustment speed of the actuator. It has also been found that from a specific adjustment speed of the actuator the alternating actuation of the proportional valve can be reduced without the control being degraded. This adjustment speed can be derived in a simple manner from a control variable of the control, such as the command variable or the correction variable or from a variable associated with a control variable, such as the difference of the amplitudes or durations of the control pulses.

In accordance with another mode of the invention, there is provided a process which comprises selecting the control variable as a command variable of the control.

In accordance with a further mode of the invention, there is provided a process which comprises selecting the control variable as a correction variable of the control.

In accordance with an added mode of the invention, there is provided a process which comprises selecting the variable associated with the control variable as a difference of amplitudes and/or pulse durations of the control pulses being associated with the command variable.

It has proven particularly expedient to actuate the control magnets of the proportional valve when in the stationary state or at low adjustment speeds of the actuator, as previously, with control pulse trains that are offset by 180° with respect to one another, but to reduce the phase angle in accordance with a stored characteristic curve or table starting from a specific limit value of the adjustment speed or control variable as the control variable increases.

In accordance with an additional mode of the invention, there is provided a process which comprises reducing the phase angle as the control variable increases.

In accordance with yet another mode of the invention, there is provided a process which comprises calling up a relation between the phase angle and the control variable from a stored characteristic curve or table.

In accordance with yet a further mode of the invention, there is provided a process which comprises varying the phase angle if the control variable or the variable associated with the control variable exceeds a predetermined limit value.

In accordance with yet an added mode of the invention, there is provided a process which comprises keeping the phase angle constant if the control variable or the variable associated with the control variable lies below the limit value.

In accordance with a concomitant mode of the invention, there is provided a process which comprises setting the constant phase angle at 180°.

Other features which are considered as characteristic for the invention are set forth in the appended claims.

Although the invention is illustrated and described herein as embodied in a process for controlling an actuator which can be adjusted by means of a proportional valve, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

FIG. 2 is a diagram showing control pulses; and

FIG. 3 is a diagram showing a variation of a phase angle between the control pulses as a function of a control variable.

Figure 1:
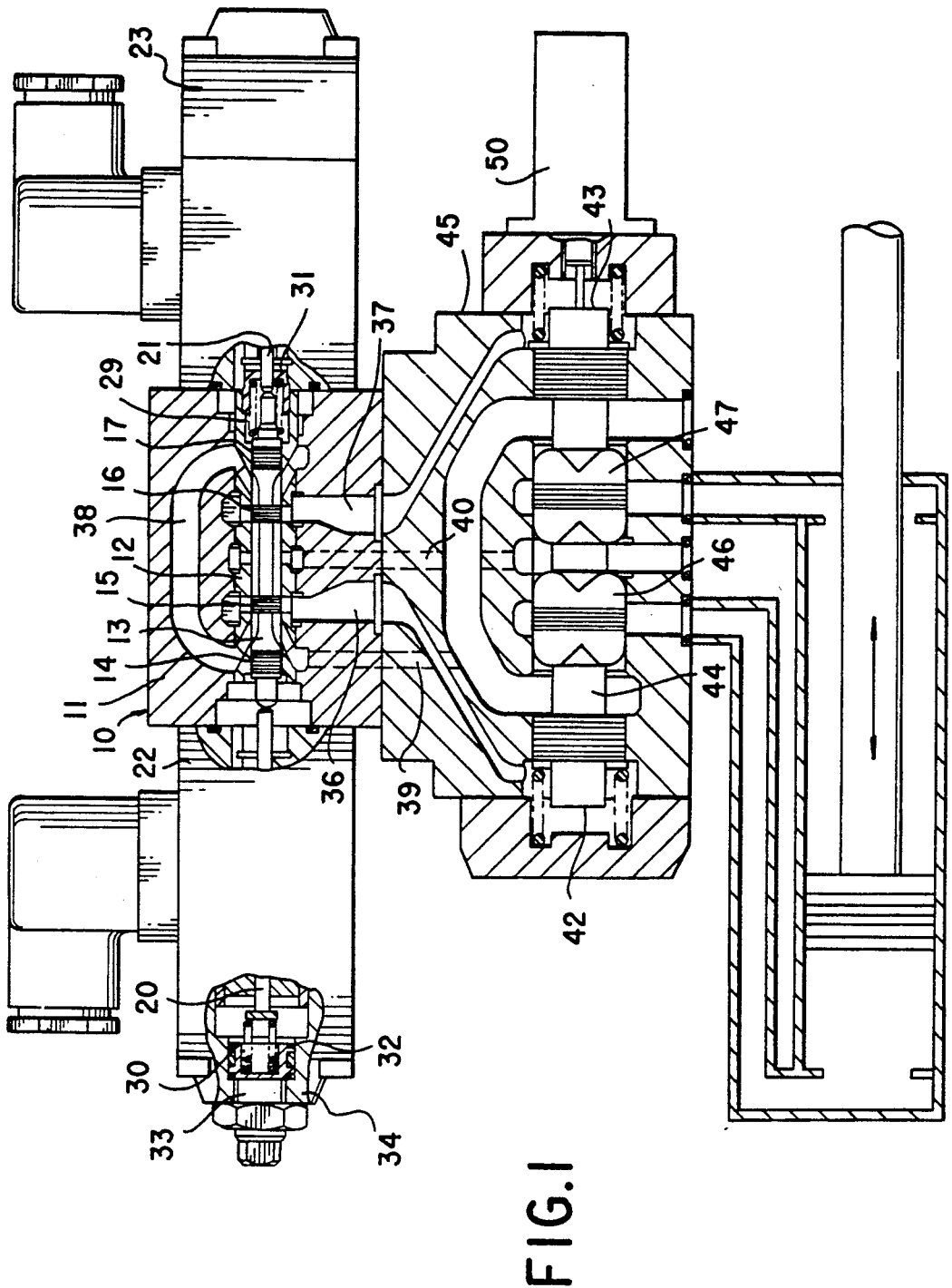
FIG. 1 is a diagrammatic, elevational view of a prior art two-stage servo valve with a magnet-actuated control valve and a four-position slide valve, being partly broken away and in section.

Referring now to the figures of the drawing in detail and first, particularly, to FIG. 1 thereof, there is seen a two-stage servo valve which is known from German Published, Non-Prosecuted Application DE 32 05 860 A1. A first stage of the servo valve has a magnet-actuated four-position slide valve 10. A control bush 12 with windows formed by erosion is inserted into a longitudinal bore of a valve housing 11, which is of a conventional type and is very economical when mass-produced on a large scale. Accordingly, the control bush can be made economically as well. A control slide 13 is disposed displaceably in the longitudinal bore of the control bush and is provided with control collars 14, 15, 16 and 17, by way of which pressure fluid conduits disposed in the housing 11 and the control bush 12 are controllable. Magnets 22, 23 have respective armatures 20, 21, each of which act upon a respective end of the control slide 13. The armatures 20, 21 are supported displaceably and are each surrounded by a magnet winding having connections which are connected to non-illustrated terminals.

The control slide 13 is shown in its middle position. To this end, the control slide is acted upon in opposite directions by two adjusting springs 29, 30, so that the middle position of the control piston is attained even in a currentless state of the magnets 22, 23.

The adjusting or centering spring 29 is disposed between the collar 17 of the control slide 13 and a hollow screw 31, which is screwed together with the control bush 12 and through which the armature 21 of the magnet 23 reaches.

The other adjusting or centering spring 30 is disposed on the side of the magnet 22 remote from the control slide 13 and is supported by one end on the armature 20 and by another end in a blind bore of an adjusting screw 32, which is screwed into a threaded bore 33 in a cap 34 of the magnet housing. By adjusting the screw 32, the spring tension of the adjusting spring 30 can be varied and thus the middle position of the control slide 13 can be adjusted from the outside.

In the middle position shown, conduits 36 and 37 leading to the second stage are blocked off by the collars 15 and 16 of the control slide 13. The spaces between the collars 14, 15 and between the collars 16, 17 communicate with a tank through a conduit 38, 39, and the space between the collars 15 and 16 communicate with a pressure fluid source through a conduit 40.

If the magnet winding of the magnet 22 is excited with a predetermined current signal, then the armature 20 shifts to the right and presses against the control slide 13, which thus likewise shifts to the right and through the control collar 16 opens the connection between the pressure fluid conduit 40 and the conduit 37, so that pressure fluid can reach the second stage, while the connection of the conduit 36 to the conduit 39 through the control collar 15 is opened, as a result of which communication between the conduit 36 and the tank for pressure relief is established. The higher the setting of the current signal in the magnet winding, the greater the force exerted by the armature. FIG. 1 also shows opposite control surfaces 42, 43 of a slider 44 of the second stage, which is formed as a four-position slide valve 45.

The slider 44 has control collars 46, 47 and an electromechanical position transmitter is fixed to one side of the valve 45.

FIG. 2 is a diagram in which variations of two control pulse trains St1 and St2 according to the invention being fed to control magnets of a proportional valve are plotted against time. With this dimensioning of the control pulses, a control piston of the proportional valve is located in a central position thereof and an actuator actuated by it remains motionless in a set position thereof. A phase angle Phi between the two control pulse trains St1 and St2 is 180°. Both pulse trains are identical with the exception of the phase shift, i.e. they have the same frequencies, the same amplitudes A and the same pulse durations D. In this state, the command variable of the control has the value "zero".

If the actuator is then moved in one direction, the command variable assumes a positive value, for example. If the control occurs by means of the amplitudes of the control pulses, the amplitude of the control pulses St1 is thus increased, for example, in accordance with an arrow a and the amplitude of the control pulses St2 is reduced in accordance with an arrow a'. Due to these unequal control pulses, the actuator moves in the desired direction. The larger the command variable, the greater the reduction of the phase angle Phi between the two control pulses in accordance with an arrow c.

If the control of the actuator occurs by means of the pulse durations D of the control pulses, the pulse duration of the control pulses St1 is lengthened in accordance with an arrow b and in the same train the pulse duration of the control pulses St2 is shortened in accordance with an arrow b'. In this case, the control of the phase angle Phi occurs as in the case of the amplitude control.

If the actuator is moved in the other direction, the amplitudes or pulse durations of the control pulses are varied (as is illustrated by dashed lines) in the opposite direction of the arrows a, a' or b, b'. However, the variation of the phase angle occurs again in the direction of the arrow c in the same way as was previously described.

The preferred variation according to the invention of the phase angle Phi as a function of a selected control variable S, in this case of the command variable of the control, is illustrated in FIG. 3. It can be seen in this case that the phase angle Phi is 180° as long as the control variable S lies below a predetermined limit value Sg and as the control variable rises, in this case the command variable therefore drops as far as the value 0° in accordance with the characteristic curve prescribed in FIG. 3, before or as soon as a maximum value Smax of the control variable is reached. As the control variable S decreases, the illustrated characteristic curve is run through in the reverse direction until the phase angle assumes the value 180° again when the actuator has reached its new position, or has virtually reached it.

During operation of the control device according to the process described above, undesired vibrations of the actuator and resulting undesired noise are avoided.

We claim:

1. A process for controlling an actuator which can be adjusted by means of a proportional valve, which comprises controlling the proportional valve by means of two control magnets with control pulses acting in opposite directions and having a specific frequency and specific mutual phase angle and at least one of variable amplitude and variable pulse duration, and varying the phase angle as a function of at least one control variable.

2. The process according to claim 1, which comprises selecting the control variable as a command variable of the control.

3. The process according to claim 1, which comprises selecting the control variable as a correction variable of the control.

4. The process according to claim 1, which comprises selecting the control variable as a difference of at least one of amplitudes and pulse durations of the control pulses being associated with the command variable.

5. The process according to claim 1, which comprises reducing the phase angle as the control variable increases.

6. The process according to claim 1, which comprises calling up a relation between the phase angle and the control variable from a stored characteristic table.

7. The process according to claim 1, which comprises varying the phase angle if the control variable exceeds a predetermined limit value.

8. The process according to claim 7, which comprises keeping the phase angle constant if the control variable lies below the limit value.

9. The process according to claim 8, which comprises setting the constant phase angle at 180°.

* * * * *

UNITED STATES PATENT AND TRADEMARK OFFICE
CERTIFICATE OF CORRECTION

PATENT NO. : 5,251,535
DATED : October 12, 1993
INVENTOR(S) : Lacher, et. al.

It is certified that error appears in the above-indentified patent and that said Letters Patent is hereby corrected as shown below:

On the Title page, item [73], change "Rexrough" to -- Rexroth --.

Signed and Sealed this

Fifth Day of April, 1994

Attest:

BRUCE LEHMAN

Attesting Officer         Commissioner of Patents and Trademarks